United States Patent [19]

Tutelman

[11] 3,753,238

[45] Aug. 14, 1973

[54] DISTRIBUTED LOGIC MEMORY CELL WITH SOURCE AND RESULT BUSES

[75] Inventor: David Morris Tutelman, Eatontown, N.J.

[73] Assignee: Bell Telephone Laboratories, Incorporated, Murray Hill, Berkeley Heights, N.J.

[22] Filed: Aug. 27, 1971

[21] Appl. No.: 175,477

[52] U.S. Cl. .......... 340/172.5
[51] Int. Cl. .......... G06f 7/00
[58] Field of Search .......... 340/172.5

[56] References Cited

UNITED STATES PATENTS

| | | | |
|---|---|---|---|
| 3,473,160 | 10/1969 | Wahlstrom | 340/172.5 |
| 3,328,769 | 6/1967 | Lee | 340/172.5 |
| 3,287,703 | 11/1966 | Slotnick | 340/172.5 |
| 3,391,390 | 7/1968 | Crane et al. | 340/172.5 |

*Primary Examiner*—Harvey E. Springborn
*Attorney*—W. L. Keefauver et al.

[57] ABSTRACT

A distributed logic memory cell for a parallel cellular logic processor has a selectable-logic-operation circuit for coupling signals from a single-conductor source bus to a single-conductor result bus. Equally ranked control flip-flop circuits are also selectable for coupling signals in the opposite direction between the buses, as well as coooperating with instruction signals from a central control to determine whether or not a particular cell will be allowed to respond to other signals applied from the central control unit to all cells of the processor. Control signals are provided on a binary coded basis and decoded within each cell.

15 Claims, 3 Drawing Figures

DISTRIBUTED LOGIC MEMORY CELL WITH SOURCE AND RESULT BUSES

BACKGROUND OF THE INVENTION

1. Field of the Invention

This invention relates to a distributed logic memory cell for a parallel cellular logic processor.

2. Description of the Prior Art

Distributed logic memory systems and cells are known in the art. An example of such a system is that disclosed and claimed in the copending D. M. Tutelman application Ser. No. 101,311, filed Dec. 24, 1970, and entitled "Distributed Logic Memory Cell for Parallel Cellular-Logic Processor," and now Pat. No. 3,670,308. The term "distributed logic memory cell" appears to derive from reference to a cell of a distributed logic memory such as that described by B. A. Crane and J. A. Githens in "Bulk Processing in Distributed Logic Memory" which appeared at pages 186–196 of IEEE Transactions on Electronic Computers, April 1965. A distributed logic memory cell may be characterized as a circuit cell which is primarily utilized in cooperation with other cells of the same type for processing data in parallel, and which cell also includes multibit memory primarily for storage of data that is useful in connection with such processing. Also included in such a cell is logic for operating on signals received from a common control, from memory within the same cell, or from other cells. In parallel cellular logic processors, a plurality of distributed logic memory cells are exercised all together or in selectable smaller groups by control signals applied in parallel to all of the cells from a microprogrammed central control unit. Double-rail logic connections are at times employed in distributed logic memory cells for signal busing within and among the cells.

In order to keep logic gate counts low, control signals which are stored in the control unit for circuit selection are either stored in a one-out-of-*n* format for direct usage or stored in binary coded format and coupled out for utilization through decoding logic generally located in the control unit. Thus, for each selection group of *n* circuit elements among which a selection is to be made, *n* control circuits are provided in a control signal bus to all of the cells in parallel so that the decoded selection is provided on a one-out-of-*n* basis from the control unit. However, in integrated circuit systems the cost of making connection bonds between bus conductors and semiconductor chips constitutes a significant proportion of the cost factor for manufacturing such systems.

The microprogram employed to control a parallel cellular logic processor is usually written in a higher level coding language which is convenient for human use and converted by an assembly program to a lower level form which is convenient for machine use. However, in some prior distributed logic memory cells, the cell organization was such that only a relatively narrow range of logic operations could be readily performed. Consequently, the performance of additonal logic operations outside of that range required many microinstructions and thus many machine cycles. A further result of this situation was that programming tended to be difficult because the human-usable level of program coding was not particularly transparent in revealing the algorithm utilized in writing the program.

Also known in the prior art are data processing systems in which a logic operation circuit and temporary storage registers are arranged for signal coupling in different directions between a pair of buses that are often designated as the masked bus and the unmasked bus. An example of such a data processor is found in the A. W. Kettley et al. U.S. Pat. No. 3,370,274. Such a processor has the capability of performing data masking logic operations utilizing either instruction-specified masks that are generated by logic when needed or special purpose masks stored in memory. When using special purpose masks, a substantial number of machine cycles are required to bring a mask to one of the temporary registers where it may be available for use, and for thereafter utilizing the mask to derive from a processor word the bit, or bit group, of data upon which it is desired to perform some further logic operation in a subsequent machine cycle.

It is, therefore, one object of the present invention to simplify the hardware requirements for distributed logic memory systems.

It is another object to facilitate the programming of parallel cellular logic processors.

A further object is to enable distributed logic memory cell operation on a single-rail logic basis for both intercell and intracell busing functions.

A still further object of the invention is to facilitate data masking operations in data processing systems.

SUMMARY OF THE INVENTION

The foregoing objects of the invention are realized in an illustrative embodiment thereof in which equally ranked control bistable circuits of a distributed logic memory cell are provided with cell-enable-gated inputs from the cell logic operation circuit. These bistable circuits also have instruction-enable-gated outputs for supplying data signals to a source bus which in turn supplies those data signals to a logic operation circuit for energizing a result bus. Signals on the result bus can then be gated to the mentioned bistable circuit inputs. The bistable circuits also have outputs which are utilized in cooperation with externally supplied control signals for producing a cell-enable gate control signal within the cell.

It is one feature of the invention that the logic operation circuit is a universal logic element which responds to control signals for performing any selectable one of a wide range of logic functions.

It is another feature that although circuit selection decoding functions are performed within each cell, rather than in a control unit which controls a group of cells, the cell gate count is still advantageous as compared to prior art distributed logic memory cells. More important, however, is the fact that a relatively small number of circuit bonds is required for connecting leads.

A further feature is that at least a portion of the decoding logic is also utilized to perform the cell-enable gating function.

A still further feature is that a group of cells controlled by a common control unit are interconnected in a predetermined sequential order by instruction-controlled global communication logic so that there is selectable global communication from any cell source bus both to the result buses of adjacent cells and to and from source buses of adjacent cells.

BRIEF DESCRIPTION OF THE DRAWING

The foregoing and other objects and features of the invention may be more completely understood from a consideration of the following detailed description when taken in conjunction with the appended claims and the attached drawing in which:

DETAILED DESCRIPTION

Figure 1:
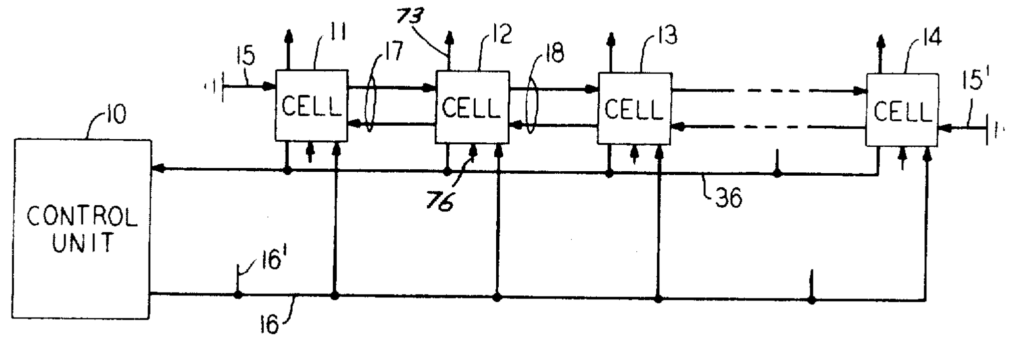
FIG. 1 is a simplified block and line diagram of a parallel cellular logic processor utilizing a distributed logic memory cell in accordance with the present invention.

In FIG. 1, the parallel cellular logic processing system shown includes a control unit 10 for coordinating the operation of a plurality of distributed logic memory cells by providing control signals thereto. In the figure, only four cells 11, 12, 13 and 14 are illustrated, and these cells receive control signals from the unit 10 by way of a multiconductor common control bus 16. Intercell connections, such as connections 17 and 18, are provided to facilitate communication among the cells. Those connections arrange the cells in a predetermined ordered sequence in which cell 14 is advantageously here considered to be in the least significant bit position of a binary coded order and cell 11 in the most significant position. Ground connections 15 on cell 11 and 15' on cell 14 operationally indicate the left-most and right-most cells, and are useful during cell initialization procedures of the type discussed in my aforementioned copending application. They also facilitate global communication among cells. Each cell includes a data memory and associated logic circuits for operating upon data from the memory, or from other sources, in accordance with signals provided by the control unit 10. Computations are carried out in the system of FIG. 1 in parallel utilizing store, read, and compare types of basic operations. Such operations are known to allow a wide range of logical and arithmetic functions to be performed. In accordance with different aspects of the present invention, a processing word can be considered to have each of its bits stored in a corresponding location of the data stores of the respective cells, or a word can be considered to have each of its bits stored in different locations of a single cell.

The cells 11 through 14 of FIG. 1 are also each provided with an output circuit and an input connection, such as the circuit 73 and the connection 76 on cell 12, for communication with circuits external to the overall parallel cellular logic processor. Such external communication will be subsequently considered in greater detail.

Each of the cells has storage capacity for a plurality of bits from a corresponding plurality of different words; and for purposes of illustration, the present invention is described in terms of an embodiment in which sixteen processing words are employed so that each cell includes a 16-bit data store. The number of bits per word may be any number and, for example, might be several bits, several dozen bits, or many hundreds of bits, with all of the corresponding number of such cells being operated under the control of the one control unit 10. Although only one bus 16 is shown, a branching lead 16' schematically represents the fact that additional strings of cells can be driven on a fanout basis from unit 10 through respective bus drivers, not shown, for all of the multiple buses. In a fan-out arrangement intercell connections advantageously extend also to cells on other buses to form a single large intercell string of all cells operated from unit 10, but this is not a limitation.

The parallel cellular logic processor just described is essentially the same as that disclosed in my aforementioned patent application. The control unit 10 includes similar circuit details and a microprogram instruction word format is used which also is similar. The principal differences in the instruction word format are that the instruction words for the present invention include an operation code field for controlling a logic operation circuit, and the word format for the present invention includes no instruction controlled data field bits for gating selection. A second difference in the instruction word format is that bit fields defining certain circuit selections within distributed logic memory cells include binary coded bit combinations rather than one-out-of-*n* coded bit combinations so that such selection-indicating fields, and the corresponding control leads, are of smaller size. For the cells of the present invention, selection fields are provided in the instruction word format for selecting cells having different activity conditions, a particular source for providing an argument signal by way of a source bus to a logic operation circuit, and a particular destination for signals provided by the logic operation circuit.

Figure 2:
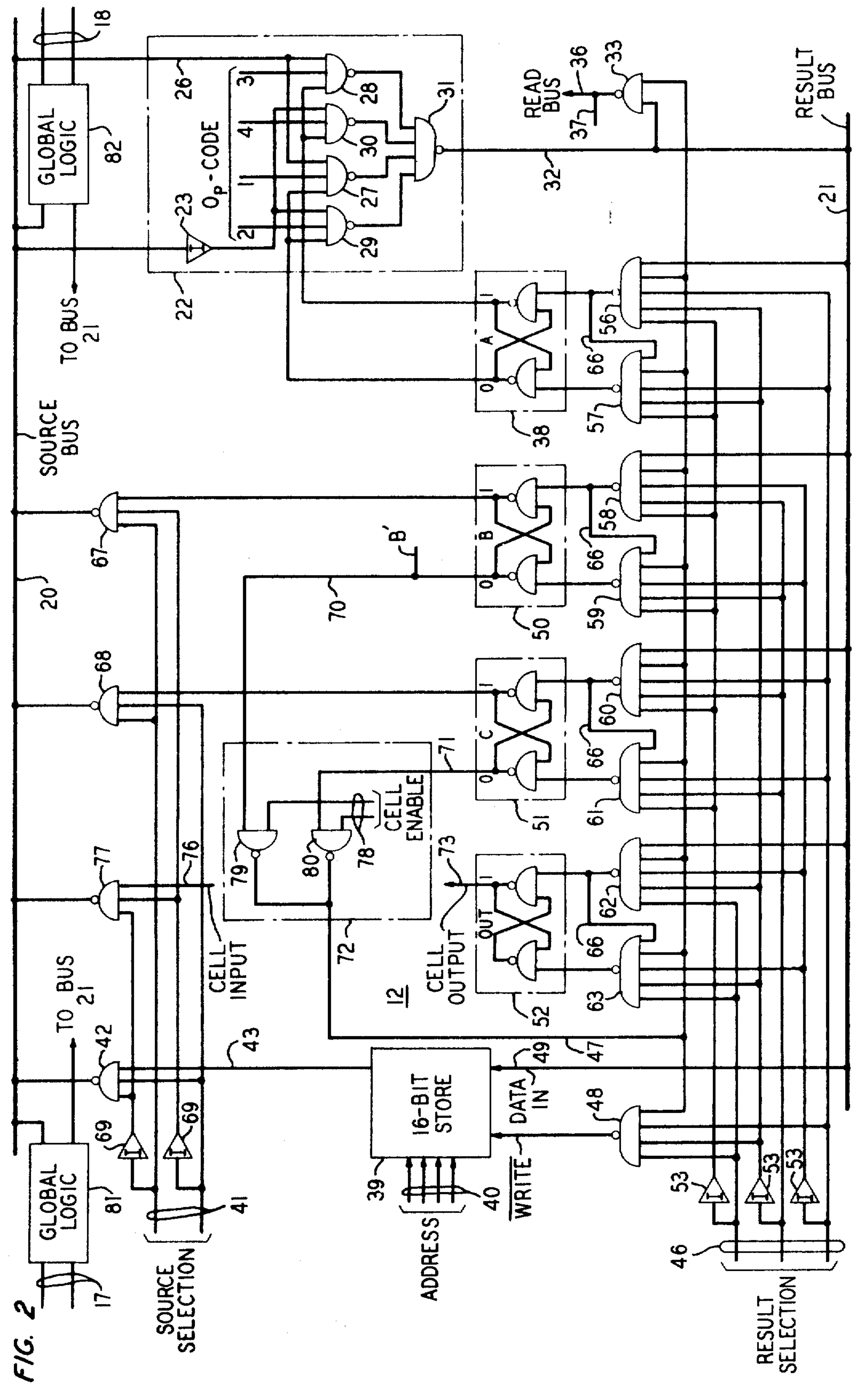
FIG. 2 is a schematic logic diagram of a distributed logic memory cell in accordance with the invention.

In FIG. 2 are shown logic circuit details of the cell 12 from FIG. 1. Inasmuch as all of the cells in the system of FIG. 1 are of the same type, the details of only one cell need be specifically considered.

A single-conductor source bus 20 and a single-conductor result bus 21 are included within each cell. The extent of each bus is limited to its particular cell; and instruction controlled gates, to be subsequently described, are utilized to extend bus connections to adjacent cells in a predetermined ordered sequence of such cells which is determined by those bus connections. A logic operation circuit 22 couples signals on a combinatorial basis from the source bus 20 to the result bus 21. Circuit 22 is of a type known in the art and includes an inverting gate 23 and an input lead 26 which cooperate for converting signals from the single-rail logic format on bus 20 to a double-rail logic format for utilization in logic operation circuit 22. The true form of source bus signals are applied by a lead 26 to one enabling input connection of each of two NAND logic gates 27 and 28. Gate 23 couples the complement form of those signals to enabling input connections of each of two further NAND gates 29 and 30. It will subsequently be seen that source bus signals are the inverted forms of signals supplied from source outputs.

Inverting, AND, and NAND gates utilized in the drawing are combinatorial logic gates. As is well known in the art, combinatorial logic maintains a particular state of signal conductivity determined by the combination of input signals applied and holds that state for as long as a given set of input signal conditions is maintained thereon. The inverting gate is simply a circuit that converts a high voltage input signal to a low voltage, e.g., ground, output signal or vice versa. The NAND gate comprises a combinatorial AND gate and an inverting gate arranged in cooperation so that a coincidence of high voltage input signals on all inputs to the NAND gate causes the gate to produce a low voltage output signal, and the presence of a low voltage input signal on any input of a NAND gate causes that gate to produce a high voltage output signal. An AND gate performs similarly, but without the inversion, to produce a high output in response to coincidence of high inputs. A multiple-emitter transistor is advantageously employed to provide the coincidence function in a NAND or an AND gate. Power supply connections to the gates are included within the schematic representation thereof.

Outputs of NAND gates 27 through 30 in logic operation circuit 22 are applied as the respective input connections of a further NAND gate 31 which supplies output signals by way of a lead 32 to the result bus 21. Gates 27 through 30 are each provided with a different input connection from control unit 10 by way of the bus 16 for supplying operation code signal combinations which define which one or more of the gates 27 through 30 is to be enabled for each particular microinstruction. Thus, in the drawing these operation code selecting leads are designated "Op-Code" and are numbered 1, 2, 3 and 4 to indicate relative bit position in a binary coded signal representation.

Output lead 32 from the logic operation circuit 22 is also coupled through a NAND gate 33 to a read bus 36. Similar gate output connections are provided to bus 36 from all other cells of the processor, as schematically represented by a partial circuit connection 37, to the bus 36 so that the logic operation circuit of any enabled cell has its output communicated to the control unit 10. In the latter unit the read bus signal is utilized to fix the state of a bistable circuit which is useful in initializing cell conditions and in carrying out program branching functions as described in my aforementioned application.

Logic operation circuit 22 is provided with a further argument signal input, in addition to that from bus 20, on a double-rail logic basis from an A-bistable circuit 38 which will be subsequently described in greater detail. It can now be seen that the circuit 22 is capable of responding to the different Op-Code signals provided from control unit 10 for accomplishing any of the possible Boolean operations on one and two input variables, those variables being the signals provided from a source by way of the source bus 20 and from the A-bistable circuit 38. These operations, and the Op-Code permutations utilized to produce them, are listed in the following Table I for the Op-Code bit numbers indicated by the reference characters on the Op-Code leads in FIG. 2. The result of each Boolean operation is indicated by the reference characters A, for the output of A-bistable circuit 38, and S, for the signals from the selected source. 1 indicates a high voltage of the correct polarity for the gate involved, and 0 indicates the low voltage condition. Symbols used with result reference characters have their usual Boolean operation significance.

TABLE I

| Op-Code Bits 1 2 3 4 | Result | Op-Code Bits 1 2 3 4 | Result |
|---|---|---|---|
| 0 0 0 0 | 0 | 1 0 0 0 | $(A+S)' = A' \cdot S'$ |
| 0 0 0 1 | $A \cdot S$ | 1 0 0 1 | $(A \oplus S)'$ |
| 0 0 1 0 | $A \cdot S'$ | 1 0 1 0 | $S'$ |
| 0 0 1 1 | A | 1 0 1 1 | $A + S'$ |
| 0 1 0 0 | $A' \cdot S$ | 1 1 0 0 | $A'$ |
| 0 1 0 1 | S | 1 1 0 1 | $A' + S$ |
| 0 1 1 0 | $A \oplus S$ | 1 1 1 0 | $(A \cdot s)' = A' + S'$ |
| 0 1 1 1 | $A + S$ | 1 1 1 1 | 1 |

It will be noted from Table I that circuit 22 also is useful as a vehicle for applying instruction-controlled data to the cells. The Op-Code 0000 puts a ZERO on the result bus regardless of the data states of the source bus and the A-bistable circuit. Op-Code 1111 similarly puts a ONE on the result bus.

A 16-bit store 39 is advantageously provided in each cell. This store is advantageously any random access store having bit locations which are addressably actuatable for writing or reading data in the store. A semiconductor memory is advantageously employed for store 39 and has sixteen bit locations and appropriate address translating logic associated in the single schematic representation in FIG. 2. A 4-bit address control signal is provided on address control leads 40 which are part of the control bus from control unit 10. These address signals from the address field of an instruction word identify a particular data store bit location and couple the input-output terminals of that location to store digit circuits which are common to all 16 of the bit locations. The information state of that addressed storage location is read out to the digit read circuit in response to the address signals, and is utilized by the cell 12 if source selection signals provide on circuits 41, also part of bus 16, comprise the necessary unique permutation for enabling a NAND gate 42 which couples a single-rail output circuit 43 from the digit circuits of store 39 to the source bus 20.

On the other hand, data information is written into an addressed data store location when a predetermined permutation of result selection signals on three circuits 46, also part of bus 16, appears at the cell 12 to allow an enabling signal from a cell enabling circuit 47 to be coupled through a NAND gate 48 for enabling input gates, not expressly shown, in the 16-bit store 39. Those input gates permit the data signal condition to be coupled from the result bus 21 by way of a circuit 49 to the store digit circuits for writing corresponding data information into the store location that is then simultaneously defined by the address signals on the circuits 40.

Result bus signals in the distributed logic memory cell of FIG. 2 can be selectively coupled to any one of a plurality of destinations. One such destination is that represented by the store 39 just described. Other selectable destinations include the aforementioned A-bistable circuit 38, a B-control bistable circuit 50, a C-control bistable circuit 51, and an OUT-bistable circuit 52. These bistable circuits are advantageously cross-coupled NAND gates. The selection of the store 39 or of one of the aforementioned bistable circuits as a data signal destination is accomplished by different combinations of the signals on the result selection circuits 46. These signals appear at the cell in single-rail logic form and are converted to double-rail logic form with the assistance of inverting gates 53. In the double-rail logic format, different combinations of the result selection signals provide enabling control to the NAND gate 48 and four further pairs of NAND gates 56,57; 58,59; 60,61; and 62,63.

The NAND gates 48 and 56 through 63 perform double duty because, as just mentioned, they accomplish the control signal decoding function insofar as the result selection signals are concerned; and they also perform the cell-enable gating function which will be subsequently described in greater detail. In addition, the gates 56 through 63 perform the still further function of converting the single-rail signals received from result bus 21 at the inputs to gates 56, 58, 60, and 62 to double-rail signals, respectively. This conversion is accomplished through cooperation with connections 66 which couple outputs of the last-mentioned gates to enabling input connections of the gates 57, 59, 61, and 63, respectively.

Double-rail signals from the outputs of the NAND gate pairs 56 through 63 are applied to set and reset input connections of the bistable circuits 38, 50, 51, and 52, respectively. These bistable circuits are equally ranked bistable circuits which are four in number, but other numbers of circuits could be provided. The bistable circuits are considered to be equally ranked because all have the same type and level of input signals from the result bus 21 and from the instruction result selection field. Similarly circuits 50 and 51 are equally ranked in a control sense because both influence the cell activity state in the same way through cell enabling logic to be described.

The binary ONE output of the A-bistable circuit 38 is connected to enabling inputs of NAND gates 30 and 28 in logic operation circuit 22. Similarly the binary ZERO output of that bistable circuit is coupled to enabling inputs of gates 27 and 29 in circuit 22.

The B- and C-bistable circuits 50 and 51 have their binary ONE outputs coupled through NAND gates 67 and 68, respectively, to the source bus 20 in response to predetermined different combinations of the source selection signals on circuits 41. (The latter signals are converted to double-rail logic form through cooperation of inverting gates 69.) Thus, the binary ONE outputs of the bistable circuits 50 and 51 are utilized for a data function. Binary ZERO outputs of the same bistable circuits are coupled by way of circuits 70 and 71, respectively, to cell enabling logic 72. These ZERO outputs are utilized in circuit 72 for facilitating the performance of logic operations on different instruction-selectable cell groups usually comprising less than all of the total number of cells influenced by control unit 10 through bus 16. Thus, the B- and C-bistable circuits 50 and 51 perform data functions in the cell and they also serve as equally ranked control bistable circuits for the cell. Other bistable circuits, including circuits 38 and 52, could also be employed as control bistable circuits.

The OUT-bistable circuit 52 is controlled by the gate pair 62,63 for supplying data signals from the result bus 21 to an output circuit 73 for communication with circuits external to the overall parallel cellular logic processor of FIG. 1. In a similar vein, input communication from such external circuits is provided to the cell by way of an input connection 76 which is coupled through a NAND gate 77 to the source bus 20 in response to a predetermined unique combination of the source selection signals on circuits 41.

Enabling logic is needed in each cell of a parallel cellular logic processor because instruction control signals provided by the control unit 10 are applied in parallel to all of the distributed logic memory cells that are coupled to bus 16. However, there are numerous occasions when it is necessary to operate on only a predetermined group of cells among the total which are available, and the group size may change from time to time depending upon the nature of the underlying processing operation. This effect is produced by storing in the stores 39 of the various cells the corresponding bits of a word which define those cells which are to be active and those which are to be inactive for a particular operation. This word, which is in a sense a mask, is advantageously placed in the stores 39 during processor initialization procedures such as those described in my aforementioned copending application.

An array of cells of the type depicted in FIG. 2 can handle two different cell activity patterns at any given time since the cell includes the two control bistable circuits 50 and 51. In order to select a particular activity pattern, it is simply necessary to apply to all cells the appropriate cell-enable control signal pattern on a pair of leads 78 in the bus 16 from control unit 10. Prior to providing those cell-enable control signals, an instruction must have been executed to read out of the store 39, or to provide directly from circuit 22, and into the appropriate control bistable circuit the desired cell pattern word.

Cell-enable signals on the leads 78 can enable either one or both of two cell-enable NAND gates 79 and 80. Each gate is further selectively enabled by the binary ZERO output on one of the circuits 70 and 71 from the B-control bistable circuit 50 and the C-control bistable circuit 51, respectively.

Outputs of both of the gates 79 and 80 are applied to the cell-enable circuit 47 which is in turn coupled to inputs of NAND gates 33, 48, and 56 through 63 for enabling those gates, if appropriately selected, to operate in response to output signals from the logic operation circuit 22. A high voltage enabling signal is required on the circuit 47 in order to allow a cell to operate. Such a signal is normally present unless at least one of the gates 79 and 80 is actuated by a coincidence of a high cell-enable signal from circuits 78 to that gate and of a high binary ZERO output signal from the corresponding control bistable circuit. Thus, for example, a first instruction causes a word to be read out of the cells stores 39. Each bit of that word is, in its respective cell, applied through the source bus 20, the logic operation circuit 22, and the result bus 21 to one of the control bistable circuits 50 or 51 as determined by control signals on result selection circuits 46. A subsequent instruction provides approrpiate cell-enable signals to gates 79 and 80 for cooperating with the particular control bistable circuit output for a particular cell to determine whether or not the signal on cell-enable circuit 47 will be high. If that signal is high in a particular cell, a response can be produced to other instruction control signals simultaneously applied to the cell by the same instruction. However, if the signal on circuit 47 is low, the cell is disabled for that particular instruction.

Figure 3:
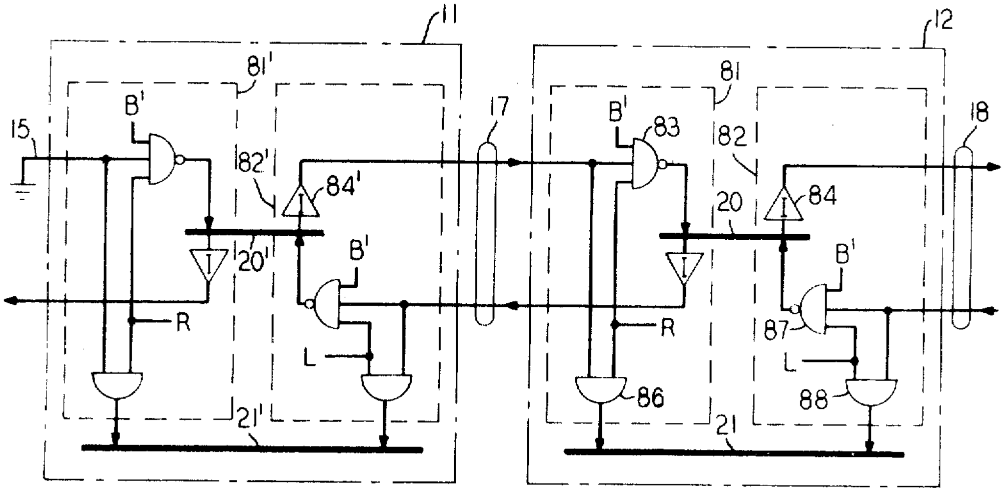
FIG. 3 is a partial logic diagram of a portion of two cells of the type illustrated in FIG. 2.

Global operation, i.e., communication between one cell and adjacent cells, is achieved by instruction controlled global logic circuits 81 and 82 in each cell. Details of the global logic for two cells, 11 and 12, which are adjacent to one another are shown in FIG. 3. In the latter figure only the global logic circuits 81 and 82 of cell 12 and corresponding circuits 81' and 82' of cell 11 are shown. These logic circuits are illustrated in conjunction with the source and result buses 20 and 21 of cell 12, and 20' and 21' of cell 11. Global logic circuit 81 in cell 12 includes a combinatorial NAND gate 83 for allowing signal application to the source bus 20 from the source bus 20' of the adjacent cell 11 on the left. An inverting gate 84' is included in the connection from bus 20' so that there is no net inversion between bus 20' and bus 20. Gate 83 is enabled by the WRITE control signal on circuit R in bus 16 from the control unit 10 and by the binary ZERO output signal B', of the B control bistable circuit 50. If the B' circuit and the R circuit are high, the signal condition on source bus 20' of cell 11 controls the output state of gate 83, and thus the signal state of source bus 20 in cell 12. This coupling between cells from left to right, and the corresponding coupling from right to left, as between cells 11 and 12, is provided by the circuits 17. It will be apparent to those skilled in the art that the functions of inverting gate 84 and the similar gate in the left-hand global output of cell 12 can all be performed by gate 23 by simply deriving both global output connections of the cell from the output of gate 23 in FIG. 2.

The same input from cell 11 to gate 83 is also applied to a combinatorial AND gate 86 which is also enabled by the WRITE control signal on circuit R for coupling the signal information from the cell 11 through the gate 86 to the result bus 21 of cell 12.

A similar global logic circuit 82 includes NAND gate 87 as well as a further AND gate 88 which are responsive to the global control signal on circuit L for allowing communication to cell 12 from the cell 13 on the right by way of circuits 18. Gate 87 must also be enabled by the binary ZERO output of the B control bistable circuit 50. Global logic circuits 81' and 82' in cell 11 are the same as the corresponding global logic circuits of cell 12 except that the data input for gates 83 and 86 is connected to ground connection 15 of FIG. 1. Similarly, the right-most cell, not shown in detail, has its data input to its gates 87 and 88 connected to ground circuit 15'. Arrowheads indicating output connection from gates 86 and 88 signify OR gate coupling to bus 20. Thus, the functions of AND gates 86 and 88 can also be performed by NAND gates with outputs coupled to bus 21 through gate 31 in FIG. 2.

It can be seen from the foregoing outline of the global logic that a global instruction bit L or R always allows the source bus in every cell to communicate to the result bus of the next adjaent cell in the specified direction. That global control signal further allows communication in the indicated direction through the source buses of all succeeding cells, beyond the adjacent cell, through the global interconnection sequence of buses 20 until a cell is reached where the B control bistable circuit 50 is in the set state, i.e., its ONE output is high and its ZERO output is low, so that the gates 83 and 87 in the global logic circuits of that cell are disabled to prevent access to the cell source bus 20.

Turning to specific types of operations that are available with the cell of the present invention, some of the basic operations are obvious from the foregoing cell description. Thus, it is apparent how the cell operates for placing data in the store 39, coupling external data into the cell, coupling cell data to external circuits, and reading out the contents of store 39. However, the performance of illustrative operations such as matching, incrementing, and global communication may not be as readily apparent from the description. These latter operations are hereinafter briefly outlined, and thereafter a short addition program will be described to illustrate the machine cycle efficiency and the relative transparency of the coding. From the foregoing basic types of operations a broad range of more complex processing functions are readily available.

As was the case in my aforementioned copending application, instructions are expressed in human readable form that indicates which binary bits of machine readable data information should appear in the high voltage state in the various fields of a corresponding instruction word in the control unit 10. It is assumed that all instruction bits are in the binary ZERO (low voltage) state unless otherwise indicated by a specific instruction symbol. Listings and explanations for the three illustrative operations are as follows:

MATCH EXAMPLE: Set B if store locations S4–S6=010. Otherwise clear B.

| | |
|---|---|
| S4' → A | Set A if store location S4=0, else clear. The source-inverting Op-Code 1010 from Table I is used to couple S4 through circuit 22. |
| S5 · A → A | Clear A unless S5=1 and A had been set in previous step. |
| S6' · A → A | Clear A unless S6=0 and A had been set in first step. |
| A → B | If B was set or A indicated a successful match, B is to be a 1, otherwise 0. |

INCREMENT EXAMPLE: Increment (add one to a binary number) S3–S5, where S5 is least significant bit (LSB).

| | |
|---|---|
| 1 → A | Initialization, e.g., by Op-Code control signals 1111. |
| S5 → C | LSB bit to C |
| C ⊕ A → S5 | Store C back in S5, but in inverted form if A is still 1. |
| C · A → A | If LSB had been zero, clear A. |
| S4 → C | Next bit. Same process, except if A was cleared in previous step it cannot again be set in this routine. |
| C ⊕ A → S4 | |
| C · A → A | |
| S3 → C | Last bit. |
| C ⊕ A → S3 | |

GLOBAL EXAMPLE: Set A in cells to the right of a C, until encountering a B.

| | |
|---|---|
| C RIGHT TO A | A prior routine must have transferred into B- and C-bistable circuits the desired cell activity patterns. The C-circuit ONE output of each C-active cell is propagated to the right through gates 83 and source buses 20 until reaching a cell where B is set so B' disables gate 83. It is also propagated through gates 86 to result buses of the same cells as well as the B (stopping) cell. In every cell where gate 86 is activated, the A bistable circuit is set by the propagated ONE. |

We turn now to an addition algorithm and program coding for implementing the algorithm for the case wherein it is desired to find the sum of the contents of locations S0 and S1 in store 39 and to place that sum in location S2 of the store. This algorithm comprises the three steps of (1) identifying carry generators and annihilators; (2) propagating carries to the left into a control bistable circuit of cells which can absorb carries; and (3) determining as the desired sum the EXCLUSIVE OR of SO, S1, and any carry which had been received in a cell from a cell to the right in the sequence of global cell connections. The illustrative program is assumed to be carried out using the full string of cells controlled from bus 16 as defining the width of registers for containing the addend, augend, and sum. Consequently, the cell-enable lead 47 is in the high voltage state in each cell.

Coding for implementing the foregoing three-step algorithm is as follows:

| | | |
|---|---|---|
| (1) SO | → A | Put contents of S0 into bistable circuit A. |
| (2) S1 · A | → S2 | AND S1 and A, and store result in S2. If both S0 and S1 had been ONE, the cell is a carry generator. In such cases logic operations circuit **22** forces result bus **21** high. Result selection signals enable the writing selection signals enable the writing in store **39**, at address location S2, of the signal state on bus **21**. |
| (3) S1′ · A′ | → B | AND S1′ and A′; store result in B-bistable circuit. If both S1 and A are ZERO, there will be carry annihilation as indicated by a high voltage on result bus **21**, which signal sets the B-bistable circuit that is now enabled by the result selection control signals, to register that signal. Now S2=1 in all carry generators, and B=1 in all carry annihilators. |
| (4) S2 LEFT TO A | | Location S2 of any cell with a carry generator from (2) now puts a high voltage on source bus **20**, and that voltage signal goes to the left through source buses of cells not having the B-control bistable circuit in the set condition. In the latter cells the A-bistable circuit is set. When propagating signal reaches a cell with B set (for carry annihilation), its A-control bistable circuit is set and carry signal propagation stops. The A-circuit in the carry generator cell is reset to ZERO by any cell to its right unless the latter cell is propagating a ONE to the left. Now A=1 in all cells into which a carry must be added. |
| (5) S1⊕A | → B | If either one, but not both, of S1 and A is ONE, set the B-control bistable circuit. Otherwise, clear B. |
| (6) B | → A | Move contents of B-control bistable circuit into the A-bistable circuit. |
| (7) S0⊕A | → S2 | If either one, but not both, of S0 or A is ONE, set S2 to the binary ONE condition. Thus, S2 contains a ONE for any cell where S0 or S1, but not both, had been ONE with no carry into it; or where both had been in the same state and an adjacent cell had propagated a carry into it. |

If at least one set of smaller registers were to be used for the addition operation, boundary cells would be defined by using a word in store 39 to reset C-control bistable circuits 51 in cells that are not to participate in the adding operation, and by applying a cell-enable signal to enable gate 80 so its output clamps lead 47 at the low voltage level to disable such boundary cells. In the latter case each instruction would include the additional coding "C-CON" to indicate that signals on cell-enable circuits 78 must enable all gates 80 and disable all gates 79.

It can be seen by comparing the instructions and the comments for the foregoing program that the instruction function is comparatively clear from the instruction symbology. Furthermore, only seven instructions were required for carrying out the indicated addition. By comparison, fourteen instructions were required for carrying out a similar algorithm in the distributed logic memory cell organization presented in my aforementioned copending application.

Another dramatic indication of the programming and operational advantages of the cell here disclosed is represented by a consideration of a scanning operation of the type presented in my copending application. The program for that operation required twelve basic instructions plus additional instructions to read out an identified line number. Utilizing the same scanning algorithm and the cell here disclosed, the number of basic instructions required in the improved program is reduced to seven. Additional instructions in the same number are still required to read out the line number.

A listing for the improved scanning process follows for a scanner of the type disclosed in my copending application wherein scanned line signal states are received by way of CELL INPUT circuits, supervisory signals to the external switching system processor are provided on the CELL OUTPUT circuits, and identified line name and state are provided on the Read Bus in bit series fashion. The listing assumes that cell storage location SO contains the last-observed state of the line monitored by each cell, and that locations S2–S11 contain the 10-bit name of that line.

| | | |
|---|---|---|
| (1) | INPUT → A | Place current states of lines into A of each cell. (Use Op-Code **0101**). |
| (2) | S0⊕A → B | EXCLUSIVE OR (Op-Code **0110**) line former and new states, and set B if different. Now B is set in those cells whose line state has changed since the previous scan. |
| (3) | B RIGHT TO C | Indicate left-most one of the changed lines by setting C in all cells to right of any cell with B set. (C remains reset in left-most B and in cells to left of it.) |
| (4) (CCON) | 0 → B | Clear B (Op-Code 0000) in C-active cells. (Only the left-most B now remains set.) |
| (5) | 1 → OUTPUT | Set OUT bistable circuit (Op-Code **1111**) in all cells as a flag to advise central processor that scanner output is coming. |
| (6) (BCON) | S2 → | In the B-active cell only, couple contents of store location S2 (first line name bit) to Read Bus. Repeat instruction for other line name bits in S3–S11. |
| (7) (BCON) | A → 27 S0 | Transmit (Op-Code 0101) new line state from C into S0. |
| (8) | 0 → OUTPUT | Remove flag to central processor. |

Although the present invention has been described in connection with a particular embodiment and application thereof, additional embodiments, modifications, and applications that will be apparent to those skilled in the art are included within the spirit and scope of the invention.

What is claimed is:

1. A parallel cellular logic system including at least one distributed logic memory cell, each said distributed logic memory cell comprising means for performing different selectable types of logic operations, said performing means including a data signal input connection for receiving signals upon which operations are to be performed and a control signal input connection for receiving control signals to determine a type of said logic operations, a source bus coupled for supplying data signals to said data signal input connection of said performing means, a result bus coupled to receive a result signal from said logic operation circuit for distribution of said result signal to a selectable circuit destination within said cell, plural selectively actuatable control bistable circuits connected for coupling result signals to said source bus from said result bus, means, responsive to predetermined combinations of output signals of said control bistable circuits, for producing a cell enabling signal, controllable means for selecting for actuation, and thus as said circuit destination, one of said bistable circuits, and means for coupling said enabling signal to enable said selecting means.

2. The system in accordance with claim 1 in which each distributed logic memory cell comprises in addition an additional bistable circuit coupled to provide signals to another data signal input of said performing means, and means for coupling result signals from said result bus to an input of said additional bistable circuit to control the stable state thereof.

3. The system in accordance with claim 1 in which said source and result buses each consists of a single conductor within a cell.

4. The system in accordance with claim 1 in which each distributed logic memory cell comprises in addition multibit data store means, means for selectively addressing individual bit locations of said store means, means for storing result signals from said result bus in an addressed location of said data store means, and means for coupling an output of said data store means to said source bus.

5. The system in accordance with claim 1 which comprises in addition external data signal circuit means, means in each of said cells for selectively coupling external data signals from said circuit means to said source bus, and means in each of said cells for selectively coupling to said circuit means result signals from said result bus.

6. The system in accordance with claim 1 in which said system comprises in addition a read bus, and each distributed logic memory cell comprises in addition means for coupling an output of said performing means to said read bus, and means for coupling said enabling signal produced in such distributed logic memory cell to actuate the performing means output coupling means.

7. The system in accordance with claim 1 which includes a plurality of said distributed logic memory cells and comprises in addition means for interconnecting said distributed logic memory cells in a predetermined ordered sequence for global communication among such cells, said interconnecting means including in each of said distributed logic memory cells a first pair of intercell coupling gates connected in said interconnecting means for coupling signals from a source bus of an adjacent cell on one side in said sequence to said source bus and said result bus, respectively, of the cell containing such gates, and a second pair of intercell coupling gates connected in said interconnecting means for coupling signals from a source bus of an adjacent cell on the other side in said sequence to said source bus and said result bus, respectively, of the cell containing such gates.

8. The system in accordance with claim 7 in which there are provided in each of said distributed logic memory cells means for connecting an output of one of said control bistable circuits to disable the one gate in each of said pairs of gates of the same cell which otherwise provides connection between cell source buses.

9. The system in accordance with claim 1 which includes a plurality of said distributed logic memory cells and in which system a control unit is provided for supplying plural sets of signals, each set defining on a binary coded basis a particular circuit selection in common for all of said distributed logic memory cells, and each of said distributed logic memory cells includes means for coupling one of said sets to said controllable selecting means, the last-mentioned selecting means including means for decoding said one set of signals to control said destination, and thus said actuation, selection.

10. The system in accordance with claim 9 in which said result bus in each cell is a single conductor bus for transmitting said output data signals in single-rail logic format, and said selecting means in each cell includes means for converting single-rail logic signals on said result bus into double-rail logic signals, with complementary signal waveforms on each of two signal paths at inputs of each of said bistable circuits, for controlling said bistable circuits.

11. The system in accordance with claim 9 in which in each distributed logic memory cell said performing means includes a further data signal input connection, a further bistable circuit is provided for selectively coupling signals to said further input connection in response to signals on said result bus, and means are provided to couple another binary coded signal set from said control unit directly to said control input connections without decoding.

12. The system in accordance with claim 1 in which in each distributed logic memory cell each of said control bistable circuits has a first and a second output connection at which complementary output signal waveforms are produced, means are provided for coupling said first output connection of each control bistable circuit to said source bus to provide the aforesaid result signal coupling thereto, and said enabling signal producing means includes means for coupling said second output connection of each control bistable circuit to said enabling signal producing means for providing said predetermined combinations of output signals.

13. The system in accordance with claim 12 in which in each distributed logic memory cell said result bus is a single conductor bus for transmitting said output data signals in single-rail logic format, said selecting means includes means for converting result bus signals to a double-rail logic format, wherein complementary signal wave formats appear on each of two signal paths at inputs of each of said bistable circuits, said converting means comprising for each of said bistable circuits means for applying said single-rail logic signals from said result bus to a first input connection of such bistable circuit, and inverting gate means for coupling signals at said first input connection of such bistable circuit to a second input connection of such bistable circuit.

14. The system in accordance with claim 1 in which said enabling signal producing means comprises a plurality of coincidence gates, means for connecting like outputs of said gates together to said enabling signal coupling means, and means for selectively enabling said gates for actuation, and said means for coupling control bistable circuit outputs to said enabling signal producing means includes means connecting to an input of each gate an output of a different one of said bistable circuits, which output has signals that are the complement of signals provided by the same bistable circuit to said source bus.

15. In combination, a plurality of bistable switching devices each having input means for controlling the operation thereof, a plurality of signal sources, said sources including outputs of at least a portion of said devices means for supplying in multiple data signals to input means of all of said devices from a selectable one of said sources, said supplying means including means for combining a signal from said one source with an additional signal in accordance with at least one predetermined logical function, means, in said input means, for selectively enabling at least one of said devices for actuation to a state representative of said data signals, a plurality of circuits for providing different condition control signal combinations, each of said control signal combinations corresponding to a different one of said devices in said portion of devices, means, responsive to coincidence of any one of said condition control signal combinations and a predetermined stable state of the corresponding one of said switching devices, respectively, for supplying a signal for disabling said device input means.

* * * * *